Nov. 28, 1933.   G. L. EVEN   1,936,832
AUTOMATIC BRAKE FOR TRAILERS
Filed Nov. 19, 1932   2 Sheets-Sheet 2
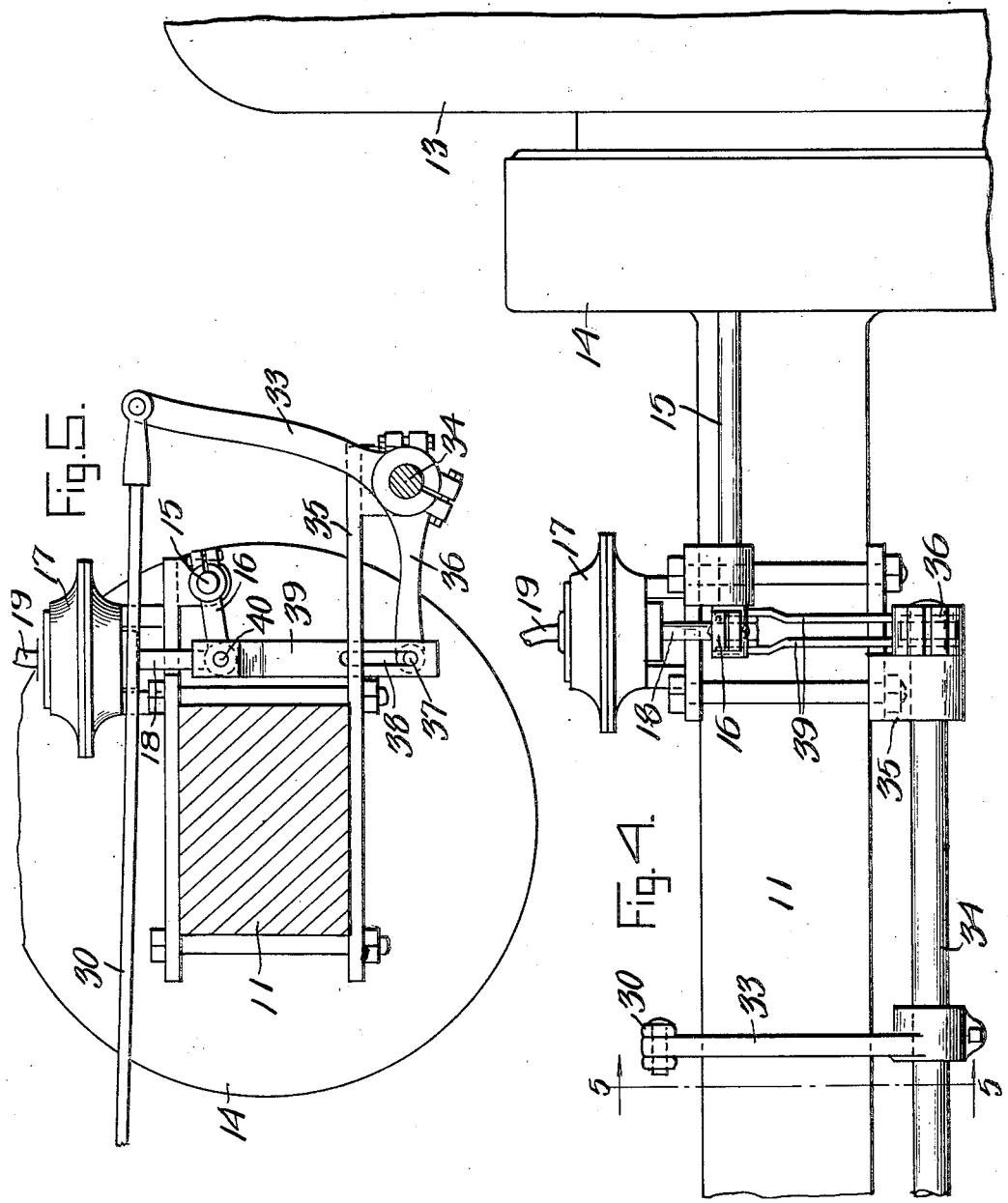
Inventor
Gregoire L. Even Patented Nov. 28, 1933

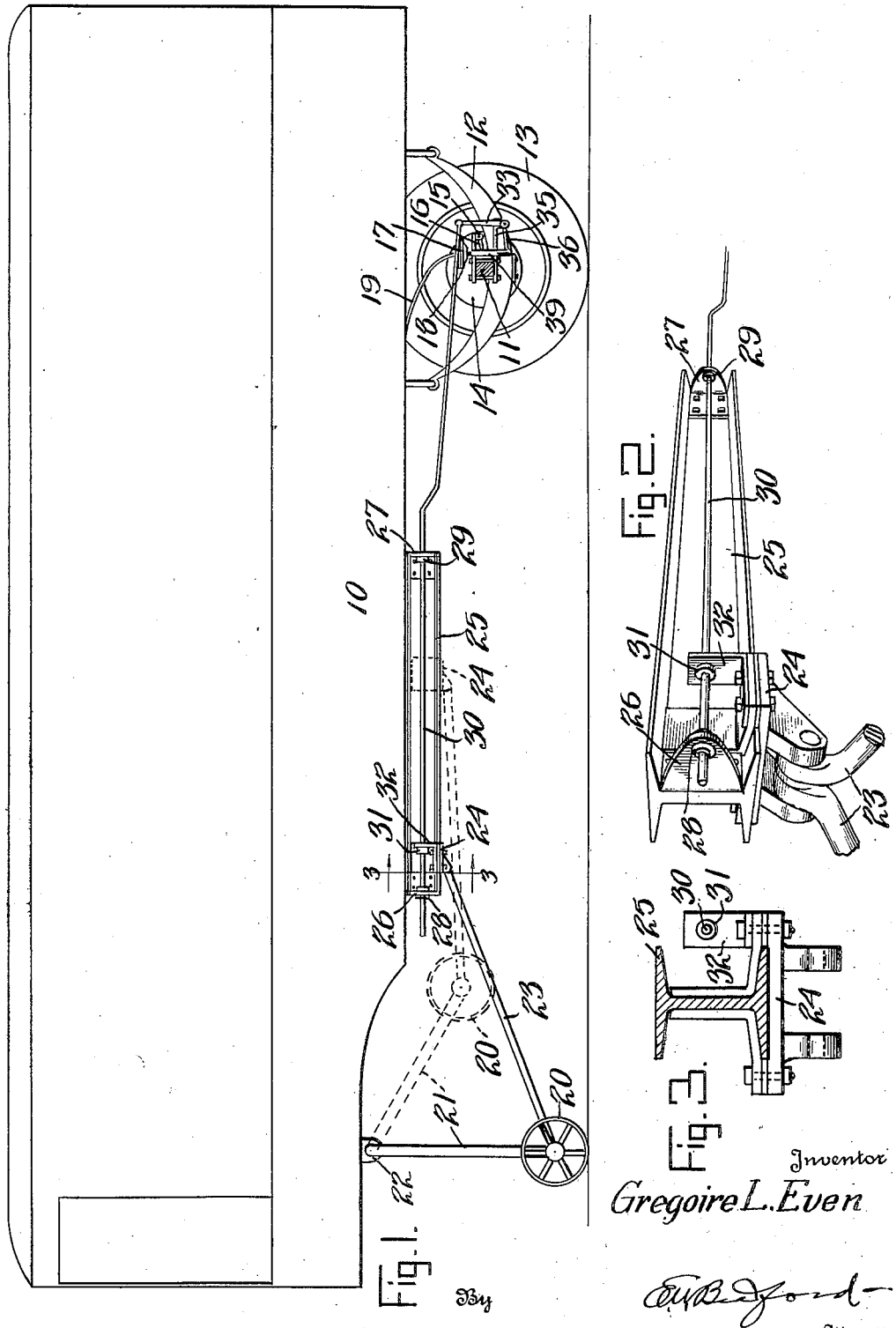

1,936,832

UNITED STATES PATENT OFFICE 1,936,832

AUTOMATIC BRAKE FOR TRAILERS

Gregoire L. Even, Detroit, Mich., assignor to The Kroger Grocery & Baking Company, Cincinnati, Ohio, a corporation of Ohio Application November 19, 1932
Serial No. 643,463

6 Claims. (Cl. 280—33.1)

My said invention relates to automatic parking brakes for semi-trailers when detached from the tractor or motor vehicle.

An object of my invention is to provide automatic means whereby the brakes on the trailer are applied when the front supporting wheels are lowered to their supporting position and released when they are raised out of supporting position.

A further object is to construct the device of parts which are readily applied to a trailer equipped with air brakes without altering or interfering with the original brake structure and without relying on the air pressure to maintain the brakes set.

The invention consists of a combination and arrangement of parts fully described in the following specification and particularly pointed out in the appended claims.

A practical embodiment of my invention is illustrated in the accompanying drawings in which similar characters represent corresponding parts in the several views.

In the drawings:

Figure 1 is a side elevation of a trailer with parts broken away to more clearly show the invention, Figure 2, a detail perspective of the I-beam and its associated parts, Figure 3, a cross section on line 3—3 of Figure 1, Figure 4, a detail rear elevation of one of the brake operating structures, and Figure 5, a section on the line 5—5 of Figure 4.

The numeral 10 denotes the body of a trailer supported on the rear axle 11 thereof for supporting the rear end of the vehicle. Brake housings 14 are located adjacent the wheels and are operated by means of a shaft 15 which extends through the housing and which has a lever 16 mounted on its free end. In the embodiment of my invention I have shown the device as applied to a trailer equipped with air brakes of a well known or any appropriate make which comprise brake chambers 17 secured to the axle 11 and having depending therefrom a bar 18 which is pivotally attached by a pin to the lever 16. The upper end of the bar 18 is attached to a diaphragm in the chamber 17. Compressed air is admitted to the chamber 17, above the diaphragm, through a pipe 19 for applying the brakes in a well known manner.

The front end of the trailer is supported when stationary by a pair of retractible wheels 20 mounted on a U-shaped shaft 21 swung from brackets 22 beneath the body 10. Radius rods 23 extend rearwardly from the ends of the shaft 21 and are pivoted in a cross-head 24 adapted to slide on an I-beam 25 secured beneath the body of the vehicle. Any suitable means (not shown) may be employed for swinging the shaft 21 with its wheels 20 to the inoperative position shown by the dotted lines in Figure 1.

The structure described above is that of a standard trailer equipped with air brakes which are controlled by the operator of the tractor or motor vehicle.

I will now describe the elements relating more particularly to my invention, which automatically apply the brakes on the trailer when it is parked for loading or unloading.

Brackets 26 and 27 are bolted to the ends of the I-beam 25 on one side thereof and have aligned openings therein forming bearings 28 and 29 through which is slidably mounted a rod 30 on which is secured a collar 31. The cross head 24 has bolted thereto an upstanding bracket 32 perforated to receive the rod 30. The rod 30 extends rearwardly and is pivoted to the upper end of a lever 33 centrally positioned on a cross shaft 34 mounted in extension brackets 35 secured to the rear axle 11. On the ends of the shaft 34 are mounted horizontal levers 36 carrying cross pins 37 adapted to ride in slots 38 in the lower ends of vertical links 39. These links 39 have perforations in their upper ends to receive the pivot pin 40 between levers 16 and 18.

The operation of the device is as follows:

Assuming that the trailer is in running condition, with the front wheels retracted and the brakes in control of the operator, the crosshead 24 is in the position indicated by dotted lines in Figure 1 and the diaphragm in the chamber 17 is in its upward position with the brakes released. Applying the brakes by air pressure depresses the diaphragm, the bars 18 and 39 which, through the medium of the pin 40, rocks the lever 16 applying the brakes. This downward movement of bars 39 does not effect the position of levers 36, 33 and bar 30 owing to the free movement of the pin 37 in the slots 38.

When the trailer is to be parked, the front wheels are lowered to the full line position shown in Figure 1 which causes the radius rods 23 to move the crosshead 24 together with the bracket 32 forward. At a point adjacent the end of the forward movement of the crosshead, the bracket 32 strikes the collar 31 on the bar 30 carrying it forward which, through the medium of the levers 33, 36 and bars 39, pulls downward on the lever 16 applying the brakes mechanically in the same manner as the air operation. This system positively locks the trailer without relying on the air pressure and is automatic in its operation with the lowering of the supporting wheels.

Although I have illustrated and described my invention as applied to a trailer equipped with air-brakes, I wish it understood that it may be applied equally as well on trailers equipped with hydraulic or mechanically operated brakes and is not limited to the precise details of structure or combination of parts as shown, but only as required by the appended claims.

Having thus fully described my said invention, what I claim as new and desire to secure by Letters Patent, is:

1. A trailer comprising a body with main supporting wheels, retractable wheels beneath the front thereof, manually controlled hydraulic braking means carried by said rear wheels, a slideway mounted beneath said body, a crosshead mounted in said slideway, radius rods connected to said front wheels and to said crosshead, and mechanical means operated by the movement of said crosshead for applying or releasing said brakes, substantially as set forth.

2. In a trailer comprising a body, main supporting wheels beneath the rear thereof, remote control manually operated hydraulic braking means for said wheels, and retractable front wheels, a slideway mounted beneath said body, a crosshead mounted in said slideway, radius rods connecting said front wheels and crosshead, auxiliary mechanical brake operating means adjacent each main supporting wheel, a brake operating bar connected to said auxiliary means, and means on said crosshead for operating said operating bar to apply or release said brakes, substantially as set forth.

3. The combination with a trailer having a body, main supporting wheels beneath the rear thereof, pneumatic brakes for said wheels, retractable front wheels, a slideway beneath said body, a crosshead slidable in said slideway, and radius rods connecting said retractable wheels and said crosshead, of auxiliary mechanical brake operating means for said rear wheels, and means operated by the movement of said retractable wheels for operating said mechanical brake operating means, substantially as set forth.

4. The combination with a trailer having manually controlled fluid operated brakes on the rear wheels, retractable front wheels, a slideway beneath the body thereof, a crosshead slidable in said slideway, and radius rods connecting the front wheels with the crosshead, of auxiliary mechanical means to apply and release said brakes operated by the raising or lowering of said retractable front wheels, substantially as set forth.

5. The combination with a trailer having a body, main supporting wheels beneath the rear thereof, pneumatic brakes for said wheels, retractable front wheels, a slideway beneath said body, a cross head slidable in said slideway, and radius rods connecting said retractable wheels and said crosshead, of auxiliary mechanical brake operating means for said rear wheels comprising a bar mounted to slide in brackets secured to said slideway, a stop on said bar, a perforated bracket carried by said crosshead and having said bar passing through said perforation therein and lever means operated by said bar for mechanically operating said pneumatic brakes to release or apply said brakes when said retractable wheels are in operative or inoperative position, substantially as set forth.

6. The combination with a trailer having manually controlled fluid operated brakes on the rear wheels, retractable front wheels, a slideway beneath the body thereof, a crosshead slidable in said slideway, and radius rods connecting the front wheels with said crosshead, a brake chamber for each wheel, a piston rod extending downward from each chamber, a brake operating lever pivoted to said piston rod, of a pair of spaced parallel links mounted on said pivot, aligned slots adjacent the lower ends of said links, a cross-shaft, horizontal levers connecting the lower ends of said pairs of links with said cross-shaft, a vertical lever on said cross-shaft and a rod connected to said vertical lever and operated by said crosshead for operating said cross-shaft to release or apply said brakes when said retractable wheels are in operative or inoperative position, substantially as set forth.

GREGOIRE L. EVEN.